United States Patent
Justen et al.

(10) Patent No.: US 9,294,827 B2
(45) Date of Patent: Mar. 22, 2016

(54) MODULE AND ASSOCIATED METHOD FOR TR-069 OBJECT MANAGEMENT

(75) Inventors: Pascal Marie Edouard Julien Justen, Sint-Pieters-Woluwe (BE); Christoph Stevens, Stekene (BE); Werner Mario Liekens, Sint-Katelijne-Waver (BE); Jan Coppens, Ghent (BE); Christele Bouchat, Antwerpen (BE); Willem Jozef Amaat Acke, Rijmenam (BE)

(73) Assignee: Alcatel Lucent, Boulogne-Billancourt (FR)

( * ) Notice: Subject to any disclaimer, the term of this patent is extended or adjusted under 35 U.S.C. 154(b) by 860 days.

(21) Appl. No.: 12/190,807

(22) Filed: Aug. 13, 2008

(65) Prior Publication Data

US 2009/0049048 A1    Feb. 19, 2009

(30) Foreign Application Priority Data

Aug. 14, 2007  (EP) .................................. 072910009

(51) Int. Cl.
*G06F 15/16* (2006.01)
*H04Q 11/04* (2006.01)
*H04Q 3/00* (2006.01)

(52) U.S. Cl.
CPC ............. *H04Q 11/04* (2013.01); *H04Q 3/0095* (2013.01); *H04Q 2213/1305* (2013.01); *H04Q 2213/13039* (2013.01); *H04Q 2213/13092* (2013.01); *H04Q 2213/13095* (2013.01); *H04Q 2213/13096* (2013.01); *H04Q 2213/13109* (2013.01); *H04Q 2213/13175* (2013.01); *H04Q 2213/13202* (2013.01); *H04Q 2213/13298* (2013.01); *H04Q 2213/13349* (2013.01)

(58) Field of Classification Search
CPC ................... H04N 21/43615; H04N 21/4147; H04N 21/25808; H04N 21/4627; H04N 21/47202
USPC .......................................... 709/217, 220, 228
See application file for complete search history.

(56) References Cited

U.S. PATENT DOCUMENTS 6,292,659 B1 * 9/2001 Olds et al. ..................... 455/427
6,553,568 B1    4/2003 Fijolek
(Continued)

FOREIGN PATENT DOCUMENTS

EP    1755283 A1    2/2007
FR    EP06291862 * 11/2006 ................ G06F 9/00
WO    2007014369 A2    2/2007

OTHER PUBLICATIONS

Nikolaidis et al., Automating Remote Configurations Mechanisms for Home Devices, IEEE Transactions on Consumer Electronics, May 2006, vol. 52:2, pp. 407-413.*

(Continued)

*Primary Examiner* — Cheyne D Ly
(74) *Attorney, Agent, or Firm* — Chiesa Shahinian & Giantomasi PC

(57) ABSTRACT

A method and apparatus for use in management of a plurality of parameters of customer premises equipment automatically and dynamically selects and/or alters one or more of a plurality of parameters based on credentials. A particular service provider can be authorized to view and/or alter one or more parameters based on credentials associated with the particular service provider. Specific service providers can be restricted to viewing other service provider's parameters while being allowed to change parameters associated with the specific service provider.

14 Claims, 2 Drawing Sheets

(56) References Cited

U.S. PATENT DOCUMENTS

| | | | |
|---|---|---|---|
| 7,075,919 B1* | 7/2006 | Wendt et al. | 370/352 |
| 7,600,249 B1* | 10/2009 | Blevins | 725/78 |
| 7,606,907 B1* | 10/2009 | Aalto et al. | 709/227 |
| 8,145,798 B1* | 3/2012 | Buck et al. | 710/8 |
| 2001/0034758 A1* | 10/2001 | Kikinis | 709/203 |
| 2003/0018889 A1* | 1/2003 | Burnett et al. | 713/153 |
| 2003/0105854 A1* | 6/2003 | Thorsteinsson et al. | 709/223 |
| 2003/0149781 A1* | 8/2003 | Yared et al. | 709/229 |
| 2003/0154299 A1* | 8/2003 | Hamilton | 709/231 |
| 2003/0191823 A1* | 10/2003 | Bansal et al. | 709/220 |
| 2004/0238620 A1* | 12/2004 | Cohagan et al. | 235/380 |
| 2006/0109854 A1* | 5/2006 | Cancel | 370/401 |
| 2006/0242625 A1* | 10/2006 | Fey | 717/118 |
| 2007/0025341 A1* | 2/2007 | Baigal et al. | 370/352 |
| 2007/0047719 A1* | 3/2007 | Dhawan et al. | 379/235 |
| 2007/0073737 A1* | 3/2007 | Patterson | 707/100 |
| 2007/0178884 A1* | 8/2007 | Donovan et al. | 455/411 |
| 2007/0186113 A1* | 8/2007 | Cuberson et al. | 713/183 |
| 2008/0133717 A1* | 6/2008 | Bouchat et al. | 709/220 |
| 2009/0009586 A1* | 1/2009 | Cassanova | 348/14.04 |
| 2009/0049048 A1* | 2/2009 | Justen et al. | 707/9 |
| 2010/0023395 A1* | 1/2010 | Bugenhagen | 705/14.45 |

OTHER PUBLICATIONS

Yoo et al., Y.-T. Kim and M. Takano (Eds.): APNOMS 2006, LNCS 4238, pp. 242-252, 2006.*

Bull et al., BT Technology Journal, vol. 24 No. 1, pp. 79-85, Jan. 2006.*

Yvan Royon, Pierre Parrend, Stephane Frenot, Serafeim Papastefanos, Humberto Abdelnur, et al . . . Multi-service, Multi-protocol Management for Residential Gateways. BroadBand Europe, Dec. 2007, Antwerp, Belgium. 2007, pp. 1-5.*

Technical Report—DSL FOrum TR-069—CPE WAN Management Protocol May 2004 pp. 1-109.

* cited by examiner

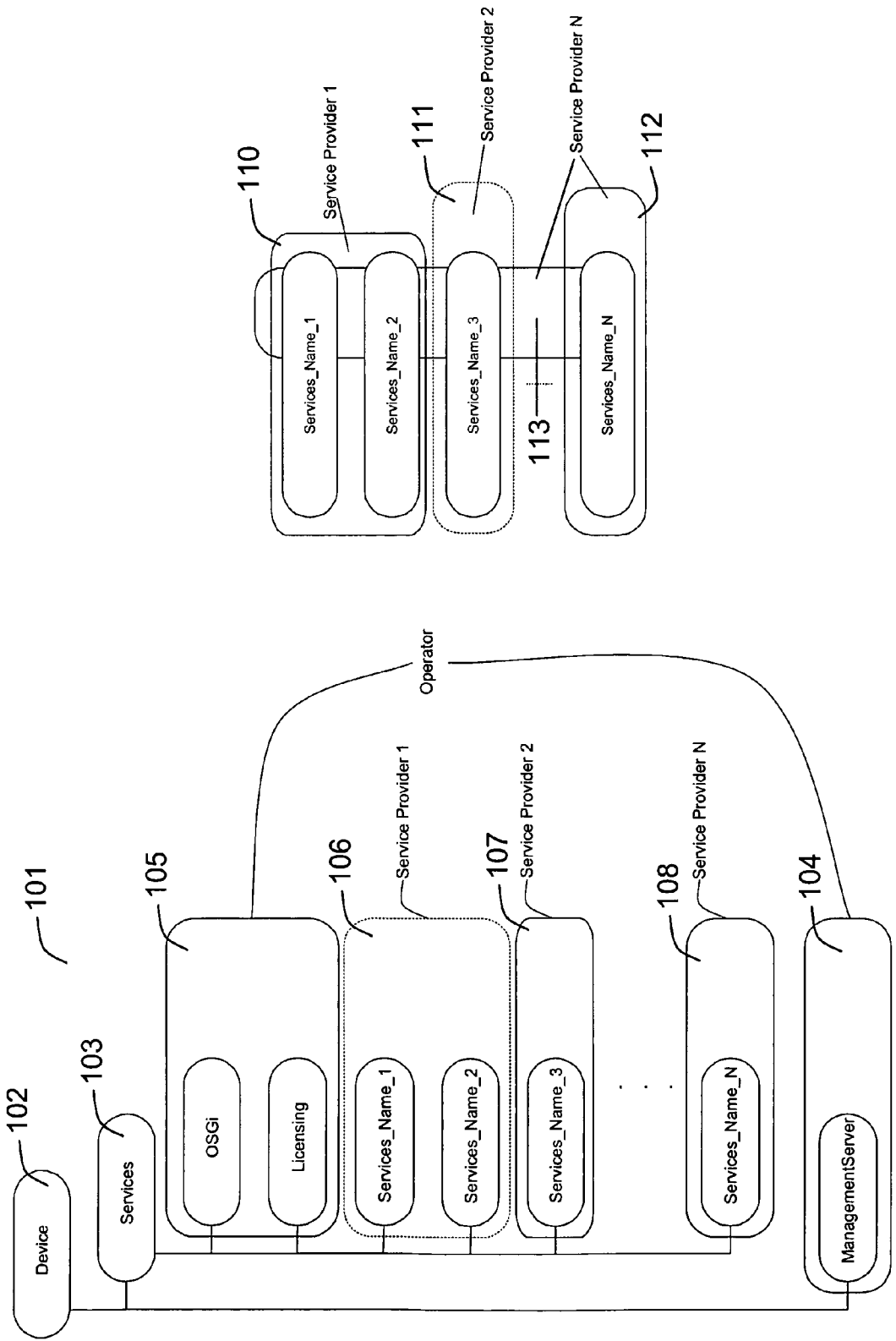

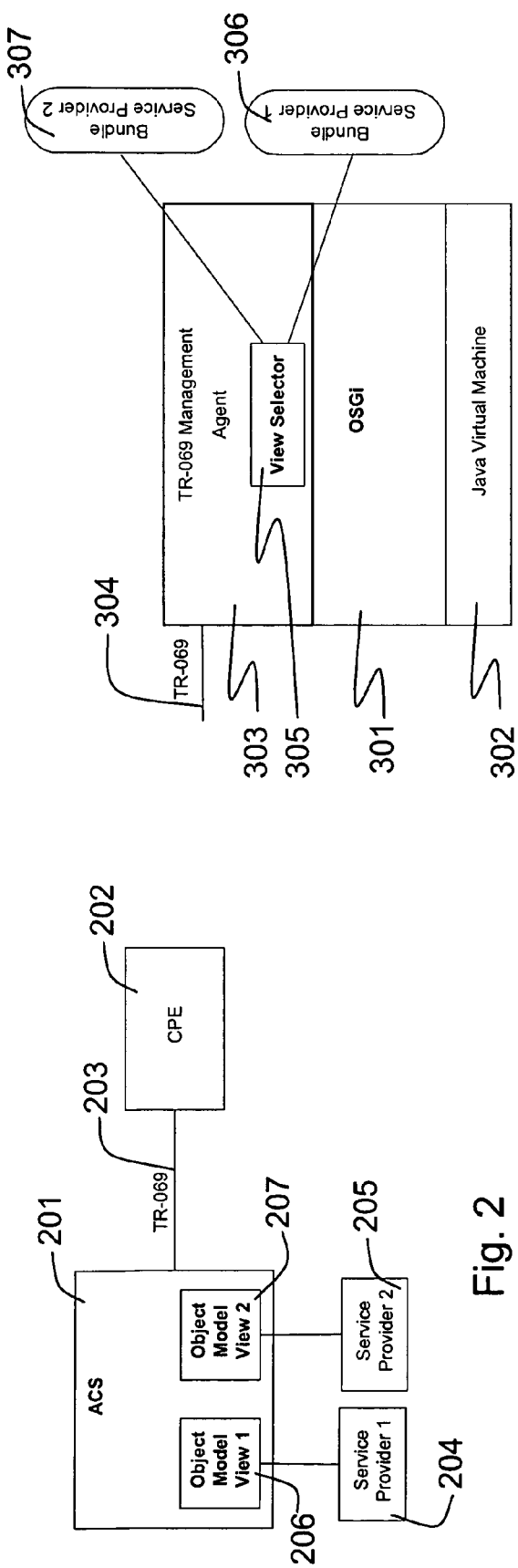
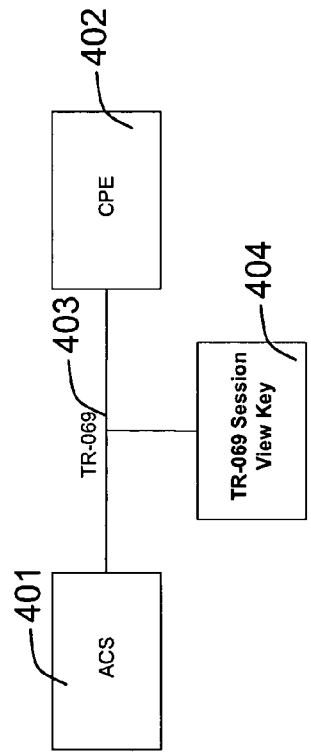
Fig. 3
Fig. 4
Fig. 2

MODULE AND ASSOCIATED METHOD FOR TR-069 OBJECT MANAGEMENT

FIELD OF THE INVENTION

The present invention generally relates to remote management, i.e. installation, configuration and removal, of application or service software modules—the so called "bundles"—on customer premises equipment (CPE) from a server located anywhere in a network with connectivity to the CPE devices. The server is named the auto configuration server or remote management server throughout this patent application. Examples of CPE or customer devices are a Digital Subscriber Line (DSL) modem, a Set-Top Box (STB), a wireless terminal such as a mobile telephone, a Personal Digital Assistant (PDA), etc. In the context of the present invention a customer device can also be a device residing in the network whereon remote management services are installed like for instance a DSLAM, a remote unit (RU), a service blade, etc. More particularly, the invention relates to management of a subset of parameters which belong to a particular service or operator.

BACKGROUND OF THE INVENTION

A home network connected to a broadband access network such as a Digital Subscriber Line (xDSL) network typically contains Customer Premises Equipment (CPE). For instance, an xDSL modem is connected on one side to one or more appliances in the home network and on the other side to a node of the xDSL service provider such as a Digital Subscriber Line Access Multiplexer (DSLAM) or other traffic aggregation node in a Central Office. The link between this CPE and the DSLAM is used to transport information, which requires the establishment of a communication session between this CPE and the DSLAM. Establishing a communication session typically involves steps such as synchronization between devices, defining error correction systems, determining transmission speed, etc. To achieve this, the modem needs information related to those steps. For instance, it needs to know which error correction codes are available, which speeds can be used, which encodings are preferred, etc. It is possible to predefine such settings in a CPE by the manufacturer. However, each service provider may use different combinations of settings for his own access network. This means that a manufacturer would have to produce a CPE for each combination of settings in the CPE which is of course too complex and not feasible.

To overcome that problem, the TR-069 management protocol is used for remote device management. This protocol enables a CPE to be configured from within the service provider network by a remote management server or an Auto-Configuration Server (ACS). Such ACS can provide all the information that is needed by a CPE to establish a communication link between the CPE and the service provider network. The ACS can easily be reconfigured by an operator, and each CPE can be configured if it supports the TR-069 management protocol. This way, each service provider can provide his settings to a CPE of any manufacturer, which is a lot more flexible than preconfigured CPEs.

The TR-069 Management Protocol is based on an Object Model which is stored in each CPE. The Object Model is made up out of a number of parameters which can be read or altered by remote procedure calls. These parameters are organized in a tree-like structure in the Object Model. As a result of the tree model, a parameter can be addressed explicitly or a subset of parameters can be addressed. Consider the following example, the root of the tree is called "device", a first subset of parameters is called "transmission" and within the subset there are two parameters "upstream-speed" and "downstream-speed". An explicit reference to one of these parameters would be "device.transmission.upstream-speed" or "device.transmission.downstream-speed". However by omitting the last part in the address, all of the parameters in that subset can be addressed via "device.transmission". The ACS can invoke a remote procedure call (RPC) to retrieve the value of one or more parameters using an addressing of that particular parameter or subset as described above. The ACS can also invoke an RPC to alter the value of a parameter or subset of parameters. Furthermore, the ACS is able to invoke RPCs which trigger updates of the software on the CPE, installation or removal of software on the CPE, etc. Thus, the TR-069 management protocol enables an operator to remotely configure and manage a CPE which means that a user can access one or more services with little effort.

The above described automatic configuration works well for a CPE which is used by only a single service provider such as an XDSL modem which is only managed by the service provider of the access network whereto a user belongs. However the TR-069 protocol is also used to remotely manage other CPE which are more service specific or which offer various services. A particular example of this is the Open Service Gateway initiative (OSGi) service platform, which is a Java-based service platform that runs on top of a Java Virtual Machine (JVM) inside the customer device that is remotely managed. Presence of an OSGi service platform in the customer device enables remote installation, update and/or removal of bundles, i.e. software modules or components such as for instance a File Transfer Protocol (FTP) application, from an auto configuration server anywhere in the network without disrupting the operation of the customer device. This way, installation of a software application, upgrading the software application to a new version, re-configuring the application, adding or activating new features of the application, and removal of the application from the customer device, is made possible without dispatching a technician to the customer premises and without requiring an intervention by the customer. Thanks to the management platform, the software services or applications running on a single customer device can share their capabilities with each other.

The drawback of a service platform such as OSGi is that the services and applications share everything on the CPE. The entire TR-069 Object Model is available to the services and applications deployed on the CPE and can be retrieved or altered by any of them. As such, each remote management server or ACS is able to modify the TR-069 Object Model and all the parameters stored therein. This means that on a CPE with multiple services running thereon which are related to various service providers, each service provider is able to modify the services and applications of the other operators. The main drawback is thus that, because the Object Model is a single accessible set of data, service operators are able to gain an advantage over other operators simply by modification of the parameters related to the other operator's services or applications. It is thus obvious that the current model is not feasible for evolving environments wherein more applications are deployed on a CPE by more and more service providers.

It is an objective of the present invention to avoid malicious use of automatic configuration in a TR-069 Object Model. It is another objective of the present invention to provide a more secure set of parameters for each service provider. It is yet another objective of the present invention to provide such secure parameters automatically.

SUMMARY OF THE INVENTION

According to the present invention the drawbacks of the prior art are overcome and the objectives of the present invention are realized by a view selector module for use in management of a TR-069 Object Model, the Object Model comprising a plurality of parameters and the module comprising means for selecting and/or altering one or more of the plurality of parameters based on credentials.

Indeed, by allowing the selection of parameters or the altering of parameters based on credentials, it becomes possible to make only a subset of the TR-069 Object Model available to a particular party such as a service provider, remote management server or ACS. This means that the particular party is only able to retrieve information from specific parameters such as those for applications or bundles installed by that party or parameters available to everyone or all applications or bundles. Similarly, only a number of parameters can be altered by a specific party whereas other parameters cannot be changed for instance because they do not belong to the party, bundle or service. Thus, it becomes impossible for operator A to view and/or modify parameters related to services of operator B. As such, operator A can no longer gain an unfair advantage for his services over operator B by reducing the capacity or quality of operator B's service.

It is noticed that access control in the Simple Network Management Protocol (SNMP), described in RFC 3415 titled "View-based Access Control Model (VACM) for the Simple Network Management Protocol (SNMP)", also involves using access credentials to determine whether a party has the right to read, write and/or be notified about a parameter.

Installation of support for the SNMP protocol on a device such as a computer, access point, router, switch, modem, etc. however typically requires human interaction. An administrator has to ensure that the software is present on the device and that the configuration files are created. One aspect of these configuration files is the access privileges for various users or groups of users to the parameters available on that particular device. Thus, a scenario where SNMP is used is divided in two parts, one being the installation or configuration of the protocol and support for the protocol by an administrator, the second part being the use of the SNMP protocol to retrieve information and/or modify parameters for a particular device.

Such two-stage scenario is avoided in a TR-069 environment that contains only one part as a consequence of which principles implemented in the SNMP environment cannot be readily transposed to the TR-069 environment without inventive merit. Indeed, the TR-069 protocol is used both to install applications to which the parameters belong and to manage such parameters. As a result, access control can easily be integrated into the installed applications or be determined automatically during the installation or downloading of applications. This means that there is no need for human interaction during the installation of bundles.

Optionally, the view selector module for use in management of a TR-069 Object Model according to the present invention may further comprise means for restricting access based on the credentials to one or more of the following:
- visibility of one or more parameters;
- mutability of one or more parameters; and
- management of one or more parameters.

For some applications it may be beneficial to allow specific access to one or more parameters in the TR-069 Object Model of a CPE. For instance some general configuration parameters which are essential for various applications such as a proxy server address or name resolution server address may be visible to every bundle or service but should only be modified by for instance the Internet service provider. In such case, the credentials of the service provider accessing the parameters can be used to determine their access level to the particular parameter. The above mentioned parameters can have their visibility set in such a way that everyone is able to see the parameter or retrieve the parameter information and have their mutability set in such a way that only a specific service operator is able to change the values of the parameters. Similarly, the general parameter management may be defined based on credentials as well. For instance a particular service provider may be able to create new parameters in a subset of the Object Model, may be able to delete one or more parameters of such a subset or may even be able to delete an entire subset. Based on the credentials of the service operator, these general parameter management operations may be rejected or performed successfully. In a more specific example, a CPE can be able to verify who requests a particular read, change or management operation on a particular parameter or subset of parameters. The CPE can then determine if the requested operations are allowed or not and make modifications or deliver requested information if needed. Of course, these access restrictions may also apply at a higher level than the parameters or subsets of parameters. The credentials may also be used to change or remove applications or services from a CPE for instance or the access restrictions may also be applied to the remote procedure calls to determine which calls are available to a particular operator.

Optionally, the view selector module for use in management of a TR-069 Object Model according to the present invention may be characterized in that the credentials are one or more of the following:
- information related to the installer of a bundle whereto one or more of the plurality of parameters are related;
- a manifest file related to a bundle or application whereto one or more of the plurality of parameters are related;
- one or more configuration parameters out of the plurality of parameters; and
- a TR-069 Session View Key;

Credentials of a service operator, which are used to determine the view of the Object Model available to the service operator, can be defined in various ways. A first way is by defining the credentials in relation to the service provider who installed a particular bundle. Such information is already available for each bundle and can be used to determine which service provider is able to manage the parameters related to a particular bundle. It may be used as a default setting meaning that by default a newly installed bundle or service can only be managed by the service provider who installed the bundle or service. Similarly, the manifest file which is used during the installation of a bundle or application may contain additional information relating to access credentials for that particular bundle or application. Access credentials can also be defined in parameters related to a particular bundle or service. Yet another possible way of implementing the credentials is by introducing a TR-069 Session View Key into the TR-069 protocol. Such key can be added to for instance a procedure call by a particular service provider or his remote management server. The protocol can then use this key to identify the service provider and/or configuration server to the bundle, application or CPE which in turn may be able to use the identification to determine the access rights and whether a procedure call is allowed or not.

Of course, these ways of defining credentials can be combined. It may for instance be possible to define a default value based on who installs a bundle by setting parameters or configuring values to the installers identity. A super user for a particular service, application or CPE can then change these settings to add more access rights for other service providers.

Optionally, the view selector module for use in management of a TR-069 Object Model according to the present invention may be adapted to be installed on a Remote Management Server.

A remote management server such as an auto-configuration server (ACS) is used to configure devices remotely. It can be used to configure access to an access network in a CPE or other services made available through the CPE. By incorporating the module into a remote management server, the allowed procedure calls or access to parameters can be defined for each service provider who uses that remote management server to manage CPE's. This can be useful in scenario's where multiple service providers share a single remote management system, for instance where an ACS is provided to other service operators by the operator of an access network whereto a CPE is connected. It ensures that only valid requests are sent to a CPE to view, alter or manage one or more parameters related to a service or application. However, this way may be abused by the owner of the remote management server as he is able to modify credentials for other service providers or give additional access to parameters of other providers.

Optionally, the view selector module for use in management of a TR-069 Object Model according to the present invention may be adapted to be installed on a Customer Premises Equipment (CPE).

By incorporating the view selector module in a CPE, the credentials and related access can be defined independently of a service provider. For instance, the CPE manufacturer may define a default setting, define settings based on requests by users or service providers or even the owners of the CPE may be able to perform credential management on the CPE. If such control is not part of the operator's abilities, there is less chance of malicious use or modification of parameters in a CPE. In addition, it may allow a particular user to tune specific services or parameters to his liking or allow a user to enable modification of particular parameters by other service providers in case they want to give an advantage to a particular service.

Optionally, the view selector module for use in management of a TR-069 Object Model according to the present invention may be integrated into a TR-069 Management Protocol.

The TR-069 Management Protocol is used to communicate between a CPE and a remote management server such as an ACS. This protocol is further also supported by the OSGi platform for interaction between various applications or services and/or a remote management server or the platform itself. Thus, by incorporating the Object Model view module into the protocol, it can be used in any existing implementation of a TR-069 compatible device by a simple upgrade of the protocol stack. For instance a CPE can be upgraded to link a particular TR-069 Session View Key to a subset of parameters in the TR-069 Object Model and then the TR-069 protocol can be used to communicate the Session View Key which would enable the selection of only particular parameters in the Object Model. Alternatively, the TR-069 protocol may be adapted to perform certain credential checks before remote procedure calls are executed or transported to a CPE or remote management server.

The present invention further relates to a method for use in management of a TR-069 Object Model, the Object Model comprising a plurality of parameters and the method comprising the step of selecting and/or altering one or more of the plurality of parameters based on credentials.

BRIEF DESCRIPTION OF THE DRAWINGS

FIGS. 1a and 1b illustrate a hierarchical overview of a TR-069 Object Model and associated rights for various service providers in an embodiment of the present invention;

FIG. 2 illustrates an embodiment of the present invention wherein the View Selection module is installed on an Automatic Configuration Server (ACS) 201;

FIG. 3 illustrates a software implementation of an OSGi platform 301 which supports an embodiment of the View Selector Module of the present invention;

FIG. 4 illustrates a yet another implementation of the View Selector module according to the present invention wherein the module is incorporated into the TR-069 Management Protocol.

DETAILED DESCRIPTION OF EMBODIMENT(S)

FIG. 1a illustrates a hierarchical overview of a TR-069 Object Model 101. This Object Model 101 is made up for a CPE or Device 102 and consists of various subsets of parameters. A first subset of parameters is the Services Subset 103 which contains all the parameters related to the various services supported by the CPE or Device 102. In addition to these parameters, the Object Model 101 also contains a ManagementServer subset 104 which contains parameters related to one or more management servers or ACS. The Services subset 103 is further divided into various groups of parameters or subsets. First, there is subset 105 of the Services subset 103 which consists of parameters or subsets related to the OSGi platform and Licensing. Both the parameters or subsets of parameters in 105 and those in the ManagementServer subset 104 are owned by the operator of the access network whereto the CPE or Device 102 is connected. Further, the Services subset 103 contains a number of subsets, being Services_Name_1 and Services_Name_2, 106 related to the various services owned by Service Provider 1. Similarly there is a subset 107 including Services_Name_3 which is related to the services owned by Service Provider 2 and a subset 108 including Services_Names_N which are related to the services owned by Service Provider N.

This figure shows the different subsets of parameters on the Device 102 and the respective owners of these subsets. Of course, although they are called subsets in this particular example, one or more of these subsets may actually consist of a single parameter. For instance, what is referred to as ManagementServer subset 104 may be a single parameter in a specific implementation. This figure further illustrates that making a distinction between the various owners of services may be beneficial to avoid abuse of access. For instance, if Service Provider 1 could access the parameters in subset 107, he could reduce the performance of Services_Name_3 and increase the performance of one or more of his own services.

FIG. 1b further illustrates access restrictions imposed on various of the above mentioned subsets of parameters. For instance balloon 110 indicates that Service Provider 1 has full access to the parameters under Services_Name_1 and Services_Name_2. Similarly, balloon 111 indicates that Service Provider 2 has full access to Services_Name_3. Balloon 112 indicates that Service Provider N has full access to Services_Name_N and balloon 113 indicates that Service Provider N is also able to access parts of Services_Name_1, Services_Name_2 and Services_Name_3. This access may be read-only, modification of the parameters or even full management of some parameters related to any of these services.

The above described figures are meant to illustrate the general concept of the present invention. They show what the effect is of the use of a module according to the present invention in a remote management environment using a TR-069 Management Protocol. The following figures illustrate on a logical level where the module can be located according to the present invention.

FIG. 2 illustrates an embodiment wherein the View Selection module of the present invention is installed on an Automatic Configuration Server (ACS) 201. The ACS 201 is used to configure CPEs such as CPE 202 over a communication link 203 using the TR-069 Management Protocol. This figure further illustrates two service providers 204 and 205, each with their respective Object Model View 206 and 207. In this particular example, the ACS is aware of the Service Provider who wants to perform an action and their access rights. The ACS is then able to present a selection of the Object Model to either Service Operator where the selection is limited to those parameters or subsets of parameters which are accessible based on the identity or credentials of the Service Provider.

FIG. 3 illustrates a software implementation of an OSGi platform 301 which supports an embodiment of the View Selector Module of the present invention. The OSGi Platform 301 is running on a Java Virtual Machine 302 which is executed on a CPE. Part of this OSGi platform 301 is the TR-069 Management Agent 303 which is connected to a communication line 304 whereon the TR-069 Management Platform is transported. The Management Agent 305 is used to manage the OSGi Platform 301 and more in particular the TR-069 aspects of the platform. It is thus in charge of managing TR-069 communication with the OSGi Platform 301 and can pass procedure calls through the view selector 305. View Selector 305 can then determine which of the bundles 306 or 307 are available to a particular service provider and perform the procedure calls on the parameters related to these bundles. Thus, no access is given to parameters related to bundles which are owned by other service providers.

FIG. 4 illustrates yet another implementation wherein an ACS 401 is connected to a CPE 402 over a communication link 403 whereon the TR-069 Management Protocol is used by the ACS 401 to manage CPE 402. However, in this particular embodiment the TR-069 Management Protocol is extended with a TR-069 Session View Key which is used in each procedure call or access to a parameter. The CPE 402 can then use the Session View Key before any access to a particular parameter is granted or before any changes to the parameters are accepted or made.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. An apparatus comprising a memory and a processor, said apparatus further comprising a view selector module adapted to manage an object model comprising a plurality of parameters, wherein said view selector module at least one of selects and alters one or more of said plurality of parameters based on credentials, said credentials comprising information identifying a specific service provider of a plurality of service providers as an installer of a bundle whereto said one or more of said plurality of parameters are related, wherein said view selector module automatically and dynamically restricts access for a particular service provider of said plurality of service providers, to viewing one or more parameters associated with any of said plurality of service providers, out of said plurality of parameters, based on credentials identifying any of said plurality of service providers, and wherein said view selector module allows said specific service provider of said plurality of service providers to change one or more parameters associated with said specific service provider of said plurality of service providers, out of said plurality of parameters, based on credentials identifying said specific service provider of said plurality of service providers.

2. The apparatus according to claim 1, wherein said view selector module further restricts access based on said credentials to:

management of said one or more parameters out of said plurality of parameters.

3. The apparatus according to claim 1, wherein said credentials further comprise one or more of the following:

a manifest file related to a bundle or application whereto said one or more of said plurality of parameters are related;

one or more configuration parameters out of said plurality of parameters; and a session view key.

4. The apparatus according to claim 1, wherein said view selector module is adapted to be installed on a Remote Management Server.

5. The apparatus according to claim 1, wherein said apparatus comprises a Customer Premises Equipment.

6. The apparatus according to claim 1, wherein said view selector module is adapted to be integrated into a TR-069 Management Protocol.

7. A method for use in management of an object model comprising a plurality of parameters, said method comprising:

at a processor, at least one of selecting and altering one or more of said plurality of parameters based on credentials, said credentials comprising information identifying a specific service provider of a plurality of service providers as an installer of a bundle whereto said one or more of said plurality of parameters are related; and automatically and dynamically restricting access for a particular service provider of said plurality of service providers, to viewing one or more parameters associated with any of said plurality of service providers, out of said plurality of parameters, based on credentials identifying any of said plurality of service providers; and allowing said specific service provider of said plurality of service providers to change one or more parameters associated with said specific service provider of said plurality of service providers, out of said plurality of parameters, based on credentials identifying said specific service provider of said plurality of service providers.

8. The method according to claim 7 wherein the automatically and dynamically restricting access for said particular service provider based on said credentials is further restricted to:

management of said one or more of said plurality of parameters.

9. The method according to claim 7 wherein said credentials further comprise:

a manifest file related to a bundle or application whereto one or more of said plurality of parameters are related;

one or more configuration parameters of the one or more of said plurality of parameters; and a session view key.

10. The method according to claim 9 wherein the automatically and dynamically restricting access for said particular service provider is further based on said session view key.

11. The method according to claim 10 wherein said session view key is used in each procedure call or access to a parameter.

12. The apparatus according to claim 3 wherein said view selector module automatically and dynamically restricts access for said particular service provider further based on said session view key.

13. The apparatus according to claim 12 wherein said session view key is used in each procedure call or access to a parameter.

14. The apparatus according to claim 1 wherein said view selector module automatically and dynamically restricts access for said particular service provider to read-only access to one or more parameters owned by other service providers different from the service provider, and restricts access to modification of one or more parameters owned by the service provider.

* * * * *